US 6,715,766 B2

(12) United States Patent
Kirby, III et al.

(10) Patent No.: US 6,715,766 B2
(45) Date of Patent: Apr. 6, 2004

(54) STEAM FEED HOLE FOR RETRACTABLE PACKING SEGMENTS IN ROTARY MACHINES

(75) Inventors: George H. Kirby, III, Charlton, NY (US); Richard Chevrette, Troy, NY (US); Matthew Patrick Boespflug, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 8 days.

(21) Appl. No.: 09/984,659

(22) Filed: Oct. 30, 2001

(65) Prior Publication Data

US 2003/0080513 A1 May 1, 2003

(51) Int. Cl.[7] .............................................. F16J 15/447
(52) U.S. Cl. ........................ 277/416; 277/411; 277/412; 277/413
(58) Field of Search ................................ 277/355, 409, 277/411, 412, 413, 416

(56) References Cited

U.S. PATENT DOCUMENTS

| 4,017,088 | A | * | 4/1977 | Lerjen ........................ 277/416 |
| 5,403,019 | A | * | 4/1995 | Marshall ..................... 277/413 |
| 5,503,405 | A | * | 4/1996 | Jewett et al. ................ 277/413 |
| 6,045,134 | A |   | 4/2000 | Turnquist et al. |
| 6,105,967 | A | * | 8/2000 | Turnquist et al. ........... 277/355 |
| 6,168,162 | B1 | * | 1/2001 | Reluzco et al. ............. 277/355 |
| 6,472,213 | B1 | * | 10/2002 | Escuyer et al. ............. 435/482 |

* cited by examiner

Primary Examiner—Anthony Knight
Assistant Examiner—E Peavey
(74) Attorney, Agent, or Firm—Nixon & Vanderhye P.C.

(57) ABSTRACT

A packing segment for an annular seal ring assembly for use in a hot gas path of a turbomachine, includes a sealing face mounting a plurality of axially spaced sealing teeth; a necked-in center portion radially outward of the sealing face; and a mounting portion radially outward of the center portion. At least one steam feed hole extends angularly from a radially outermost face of the segment to a location along a side of the center portion such that, in use, at least a portion of the feed hole is exposed to hot gas in the hot gas path for flow through the feed hole to a cavity behind the segment.

7 Claims, 1 Drawing Sheet

STEAM FEED HOLE FOR RETRACTABLE PACKING SEGMENTS IN ROTARY MACHINES

BACKGROUND OF THE INVENTION

The present invention relates to retractable packing components for rotary machines such as steam and gas turbines.

Rotary machines such as steam and gas turbines used for power generation and mechanical drive applications are generally large machines consisting of multiple turbine stages. In such machines, high pressure fluid flowing through the turbine stages must pass through a series of stationary and rotary components. Annular, segmented seals mounted on the stationary components are used to control leakage of fluid along the path between the stationary and rotary components. The efficiency of the turbine is directly dependent on the ability of the segmented seals (also referred to as packing segments) to prevent leakage, e.g., between the rotor and stator. In certain designs, springs maintain the packing segments radially outwardly of the rotor, for example, during start-up and shutdown. After the rotor has been brought up to speed, fluid pressure is supplied between the packing segments and a cavity in the rotor housing behind the segments to displace the segments radially inwardly to obtain smaller clearances with the rotor.

In the exemplary embodiment, the annular seal ring segments, or packing segments, are secured by dovetail type arrangements to stationary nozzle diaphragms located axially between adjacent rows of buckets on wheels that rotate with the turbine rotor. During unit startup and shutdown, one or more compression springs located between the retractable packing segments and the stationary diaphragm produce forces upon the segments that increase the radial clearance between the packing segments and the rotor. When a sufficient pressure drop occurs between startup and shutdown, the pressure-force exceeds the resisting forces of the spring (s), thereby decreasing the radial clearance. This pressure force is made possible by the introduction of steam through steam feed holes in the packing segments. These holes are typically drilled in the packing segments, opening on the high pressure sides of the segments, to allow the steam pressure to build in the cavities behind the segments. Conventionally, these feed holes are drilled axially on the steam flow side, and radially on the back face of each packing segment, meeting internally of the segment, thus creating a 90°, L-shaped thru hole. This arrangement, however, requires multiple steps in manufacturing, and the sharp turn in the passageway becomes a location for solid particle erosion and/or build up. The latter will hinder turbine performance over time.

BRIEF DESCRIPTION OF THE INVENTION

This invention relates to a new arrangement for steam feed holes in retractable positive pressure packing segments. In this design, there are one or more holes (as needed) in each packing segment passage, having an angled centerline relative to the packing body. By drilling a single, angled steam feed thru-hole, the L-shaped hole multi step manufacturing process is eliminated, reducing manufacturing time as well as solid particle build up. This new feed hole design also results in a stronger packing segment, compared to conventional steam feed hole designs.

Accordingly, in one aspect, the invention relates to a packing segment for an annular seal ring assembly for use in a hot gas path of a turbomachine, the segment comprising a sealing face mounting a plurality of axially spaced sealing teeth; a center portion radially outward of the sealing face; and a mounting portion radially outward of the center portion, the mounting portion having a radially outermost face; and at least one steam feed hole extending angularly from a first location on the radially outermost face to a second location along a side of the center portion such that, in use, at least a portion of the feed hole is exposed to gas in the gas path for flow through the feed hole to a cavity area behind the segment.

In another aspect, the invention relates to an annular seal ring assembly for a turbine nozzle diaphragm comprising a plurality of part annular packing segments adapted to seat in a dovetail groove in the diaphragm, with a cavity radially between a back face of the segment and the diaphragm, each segment comprising a sealing face mounting a plurality of axially spaced sealing teeth; a center portion radially outward of the sealing face; and a mounting portion radially outward of the center portion, the mounting portion having a radially outermost back face; and at least one steam feed hole extending angularly from a first location on the radially outermost face to a second location along a side of the center portion such that, in use, at least a portion of the feed hole is exposed to gas in a hot gas path for flow through the feed hole to a cavity behind the segment to thereby displace the packing segment in a radially inward direction.

DETAILED DESCRIPTION OF THE INVENTION

Figure 1:
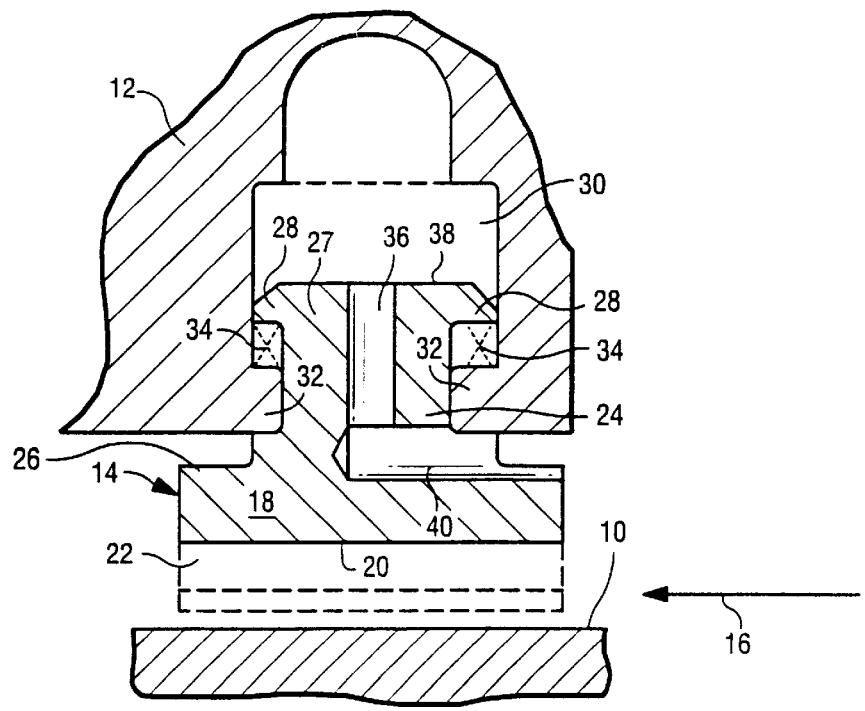
FIG. 1 is a schematic illustration of a convention packing ring segment including a known steam feed hole arrangement.

With reference initially to FIG. 1, there is shown a portion of a rotary machine such as, for example, a steam turbine or a gas turbine. The machine includes a shaft or rotor 10 disposed in a turbine diaphragm 12, with the shaft 10 supported by bearings in a conventional manner within the turbine housing. An annular seal ring 14 is disposed in the stationary diaphragm component of the turbine housing, axially between adjacent turbine wheels (not shown), and separating high and low pressure regions on axially opposite sides of the ring. As shown in FIG. 1, the high pressure region is to the right, and the low pressure region to the left, with steam or gas flow in the hot gas path indicated by arrow 16. The seal ring 14 is formed by a plurality of arcuate seal ring or packing segments 18 having sealing faces 20 and a plurality of radially projecting, axially spaced labyrinth (or other) seal teeth, indicated at 22 by dotted lines. Typically, a packing segment of this type functions by presenting a relatively large number of barriers, e.g., teeth, to the flow of fluid from the high pressure region to the low pressure region, with each barrier or tooth forcing the fluid to follow a tortuous path whereby pressure drop is created. The sum of the pressure drops across the seal is by definition the pressure difference between the high and low pressure regions on axially opposite sides of the seal ring.

Typically, the packing segments 18 have a necked-in center portion 24 between the radially inner sealing portion 26 and a radially outer mounting portion 27 that includes dovetail flanges 28. A cavity 30 is defined in part by inward facing hooks 32 that are received within the necked-in portion 24, and limit the inward movement of the segment via interaction with flanges 28, thus securing the segment 18 to the diaphragm 12, but permitting the radial inward and outward movement described above.

Typically, springs 34 are utilized to maintain the segments 18 radially outwardly away from the rotor, for example, during startup and shutdown. When the rotor has been brought up to operating speed, however, fluid pressure supplied between the seal ring segments and the cavity 30 in the rotor housing overcomes the spring forces and displaces the packing segments 18 radially inwardly to obtain a smaller clearance with the rotor 10.

Conventional design requires that two feed holes be drilled in each segment. Specifically, a radial hole 36 is drilled from the radially outer or back face 38 of the packing segment radially inwardly to a location where it intersects with an axially drilled hole 40 that opens along the side of the segment, i.e., open to the high pressure steam flow from right to left. The two holes 36 and 40 meet at a 90° angle internally of the segment, thus forming an L-shaped thru hole.

Figure 2:
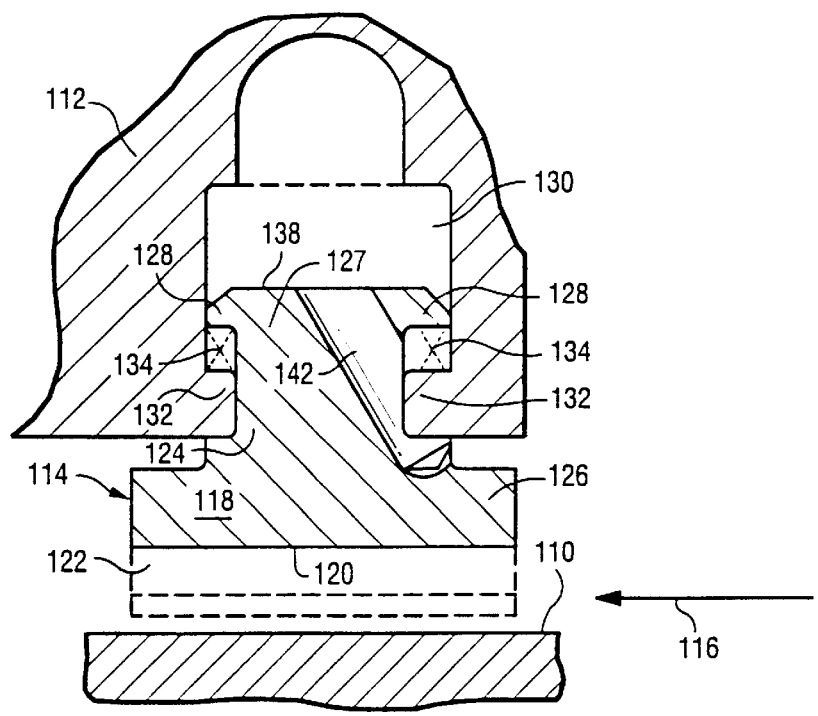
FIG. 2 is a schematic illustration similar to FIG. 1 but with a new steam feed hole arrangement in accordance with the invention.

Turning to FIG. 2, a packing segment 118 for an annular seal ring 114 is shown incorporating a new steam feed hole design in accordance with this invention. For convenience, similar reference numerals are used to designate corresponding components, but with the prefix "1" added. The packing ring segment 118 includes a sealing face 120, a radially inner sealing portion 126, seal teeth 122, a necked-in center portion 124 and a radially outer mounting portion 127, including dovetail flanges 128. A cavity 130 is formed between the segment and the diaphragm. A single hole 142 is drilled from the back face 138 of the segment through the radially outer mounting portion 127 and the necked-in center portion 124 to the high pressure steam side of the segment 118 at a determined angle, in one continuous set-up. The hole 142 is drilled at an angle consistent with required strength characteristics of the segment, with a diameter determined by steam volume requirements. As shown, the hole 142 cuts across the necked-in portion 124, ensuring that the hole exit will be exposed to the high pressure steam flow. The angle of the centerline, hole size and number of holes will be unique to customer unit requirements. The method of manufacturing the hole will involve a single drilling process, but could involve a separate reaming step if so desired.

By drilling a single angled steam feed thru hole 142, the prior and less efficient L-shaped hole multi-step manufacturing process is eliminated.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A packing segment for an annular seal ring assembly for use in a hot gas path of a turbomachine, the packing segment comprising a radially inner sealing portion including a sealing face mounting a plurality of axially spaced sealing teeth; a necked-in center portion radially outward of said sealing face; and a mounting portion radially outward of said center portion, said mounting portion having a radially outermost face; and at least one steam feed hole extending angularly between a first location on said radially outermost face and a second location along a side of said necked-in center portion such that, in use, at least a portion of said feed hole is exposed to gas in the gas path for flow through said feed hole to a cavity area behind said segment.

2. The packing ring segment of claim 1 wherein said steam feed hole extends at an acute angle relative to a radial center line through the segment.

3. The packing ring segment of claim 1 wherein said steam feed hole has a diameter determined by steam volume.

4. The packing ring segment of claim 1 wherein said mounting portion includes a pair of laterally extending flanges adapted to seat radially behind a pair of dovetail hooks in a nozzle diaphragm.

5. An annular seal ring assembly for a turbine nozzle diaphragm comprising a plurality of part annular packing segments adapted to seat in a dovetail groove in the diaphragm, with a cavity radially between a back face of the segment and the diaphragm, each segment comprising a sealing face mounting a plurality of axially spaced sealing teeth; a center portion radially outward of said sealing face; and a mounting portion radially outward of said center portion, said mounting portion including a pair of laterally extending flanges adapted to seat radially behind a pair of dovetail hooks in the nozzle diaphragm; and having a radially outermost face; and at least one steam feed hole extending angularly between a first location on said radially outermost face and a second location along a side of said center portion such that, in use, at least a portion of said feed hole is exposed to gas in a hot gas path for flow through said feed hole to a cavity behind said packing segment to thereby displace said packing segment in a radially inward direction.

6. The packing ring segment of claim 5 wherein said steam feed hole extends at an acute angle relative to a radial center line through the segment.

7. The packing ring segment of claim 5 wherein said steam feed hole has a diameter determined by steam volume.

* * * * *